March 4, 1930.    S. L. PRESSEY    1,749,226
MACHINE FOR INTELLIGENCE TESTS
Filed June 21, 1928    3 Sheets-Sheet 1
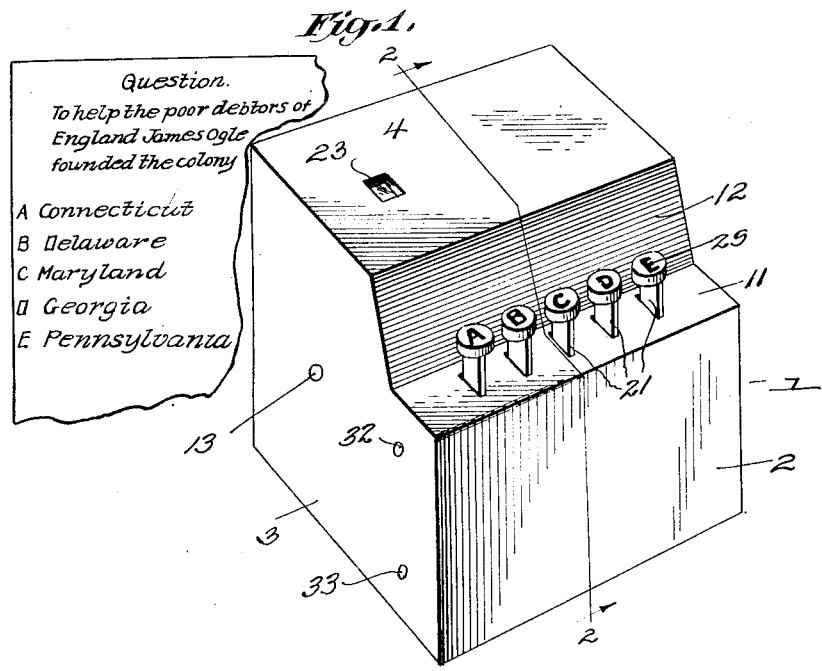
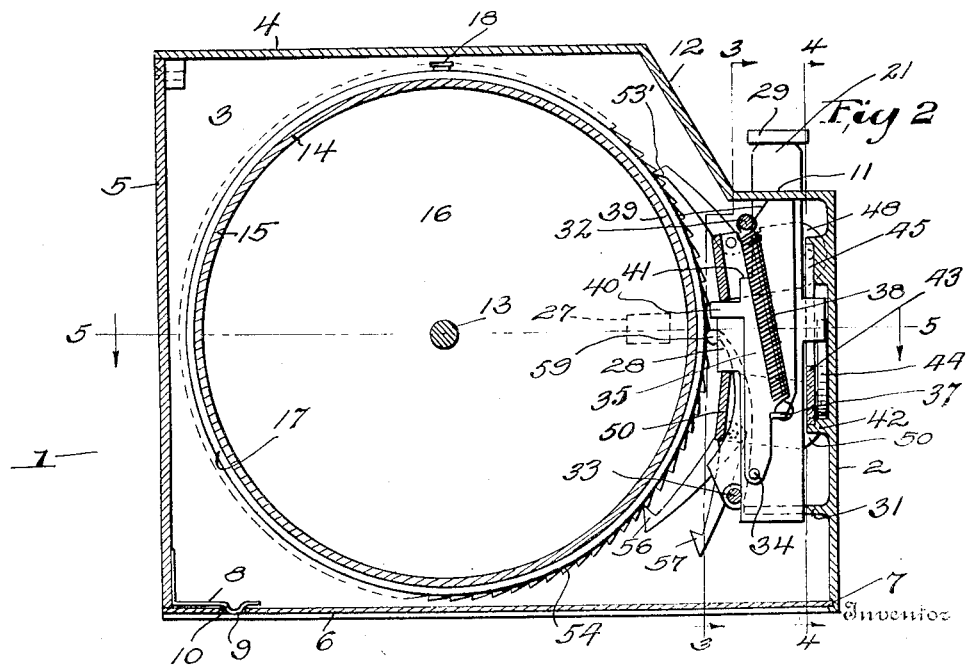
Inventor
S. L. Pressey

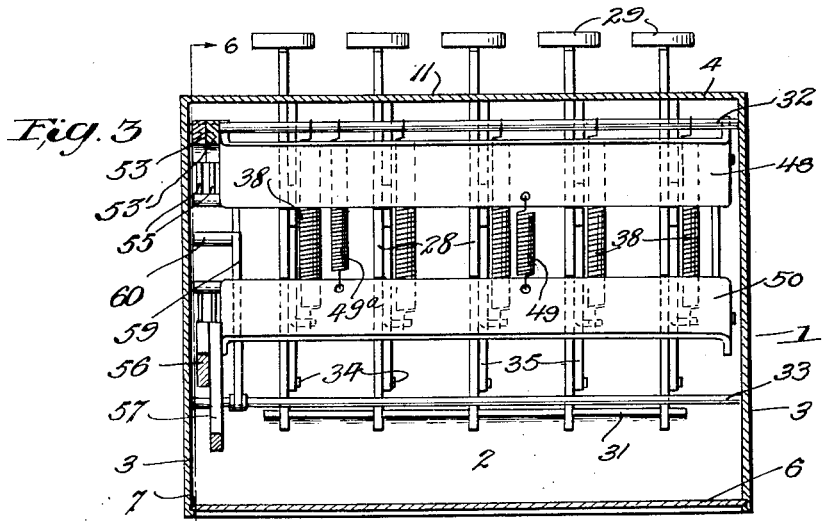
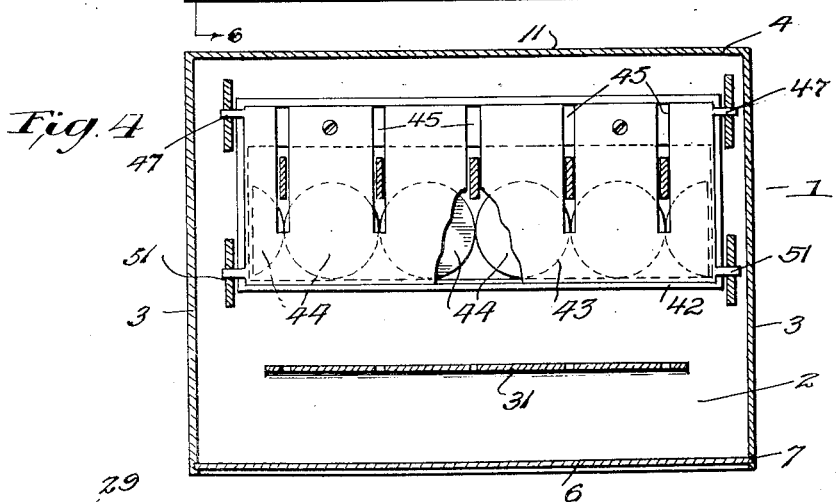
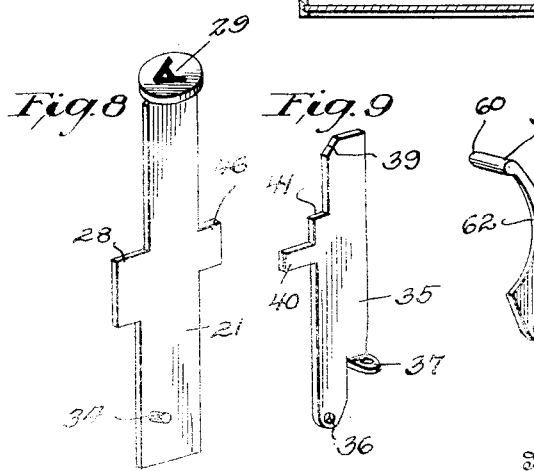
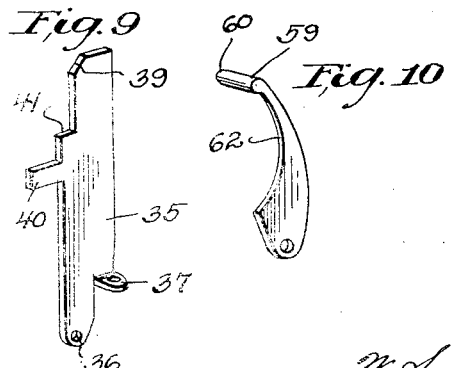

March 4, 1930.  S. L. PRESSEY  1,749,226
MACHINE FOR INTELLIGENCE TESTS
Filed June 21, 1928  3 Sheets-Sheet 3
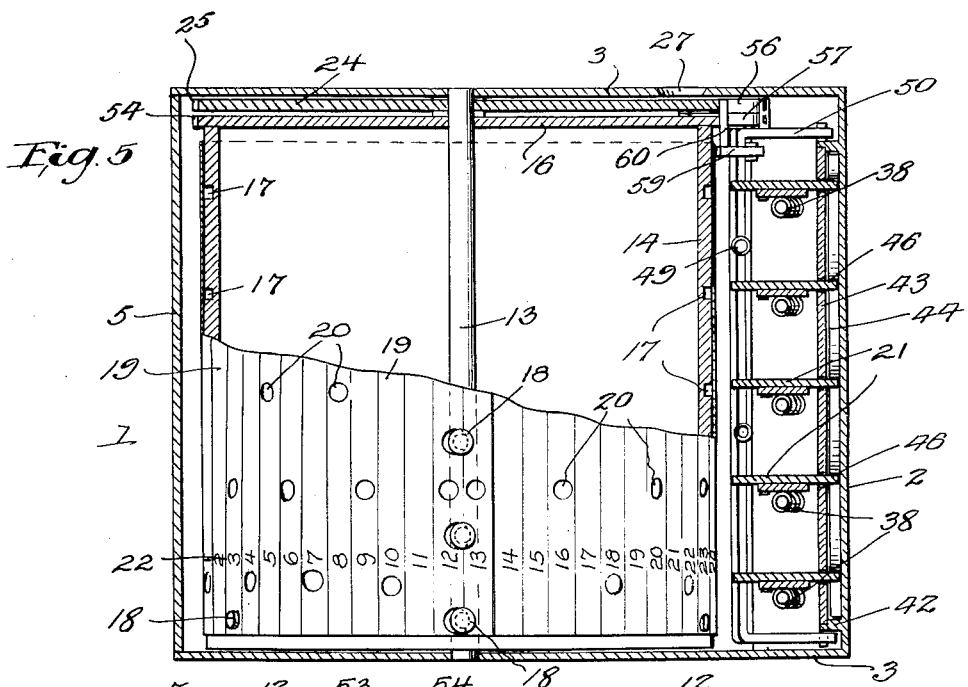
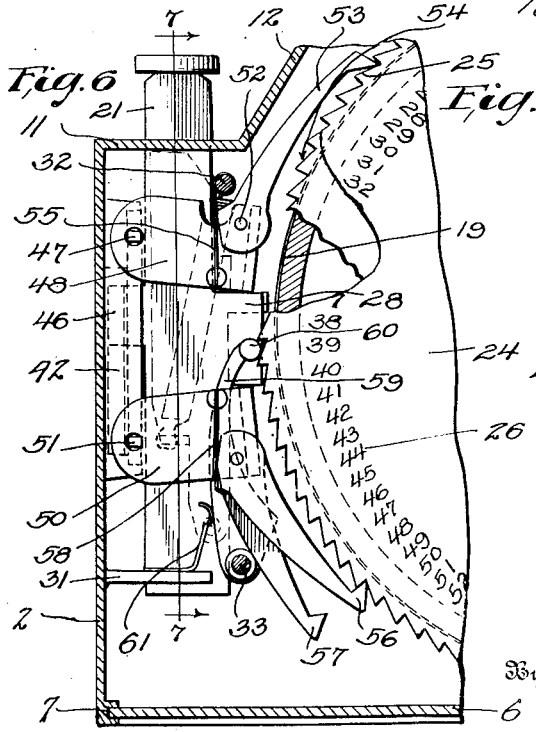
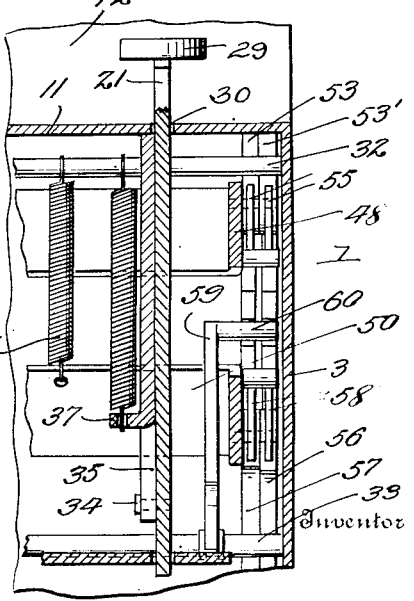
S. L. Pressey
Attorney Patented Mar. 4, 1930

1,749,226

UNITED STATES PATENT OFFICE

SIDNEY L. PRESSEY, OF COLUMBUS, OHIO

MACHINE FOR INTELLIGENCE TESTS

Application filed June 21, 1928. Serial No. 287,293.

This invention relates to an improved machine adapted for the purpose of facilitating the conducting or taking of what are known as objective tests, or in certain instances psychological or intelligence tests, in which the person taking the test indicates the correct answer to such questions as:

"To help the poor debtors of England James Oglethorpe founded the colony of: (a) Connecticut, (b) Delaware, (c) Maryland, (d) Georgia, (e) Pennsylvania."

Such tests are very widely used in schools and resort is frequently made to printed forms and to mimeographed or typewritten forms as made up by instructors. However, as now generally conducted the student underlines what he conceives to be the right answer on the blank before him, thus permitting each blank to be used only once. The scoring of the test by the instructor is, moreover, a time consuming task, and a task in which errors are often made. In accordance with the present invention a mechanical device is provided to permit of the repeated use of such blanks and to provide for scoring the test automatically or mechanically as it is being taken.

Another object of the invention resides in the provision of a simplified and efficient machine, adapted for the purpose set forth, wherein the machine is formed to include a plurality of individual movable selector keys which are adapted to be depressed by the student to indicate his answers to the questions propounded, provision being made in the construction of the machine to register the responses of the student by noting (a) the number of correct answers, or (b) the number of reactions or individual operations of the selector keys used.

A further object of the invention rests in the provision of means for controlling the operation of the machine which include a drum provided at longitudinally spaced intervals with annular grooves and around the periphery of which there is placed a perforated strip of paper or other similar material, readily removable from the drum at will, the perforations of said strip of paper being disposed in registration with certain of the grooves of the drum, whereby through the provision of this construction when a selector key is depressed its operative movement is regulated by said perforated strip and drum in such manner as to provide for a desired registration of the reactions.

It is another object of the invention to provide a machine which will constitute an improvement upon that set forth in my prior Patent 1,670,480, issued May 22, 1928, generally simplifying the construction of said machine providing for improved functional operations in the various mechanical units comprising the machine, in constructing the machine so that its actuation is effected upon the upstroke or return movement of the selector keys following manual depression thereof, and providing the peripheral portion of the operating drum with perforations in a removable member and cooperative with the selector keys to govern the functioning of the machine, in eliminating the test sheet holder and in other improvements which will be in part obvious and in part pointed out hereinafter.

With these and other objects in view which will appear as the description proceeds, the invention consists in the novel features of construction, combinations of elements and arrangement of parts hereinafter to be fully described and pointed out in the appended claims.

In the accompanying drawings:

Figure 1 is a view showing a portion of a test sheet together with a perspective view of a machine for conducting objective tests of the character set forth and constructed in accordance with the present invention, Figure 2 is a vertical sectional view taken through the machine on the plane indicated by the line 2—2 of Figure 1, Figure 3 is a longitudinal sectional view taken on the line 3—3 of Figure 2, Figure 4 is a similar view on the line 4—4 of Figure 2, Figure 5 is a horizontal sectional view on the line 5—5 of Figure 2, Figure 6 is an enlarged transverse sectional view taken on the plane indicated by the line 6—6 of Figure 3, Figure 7 is a vertical sectional view on the line 7—7 of Figure 6, Figure 8 is a detail perspective view of one of the selector keys, Figure 9 is a perspective view of one of the keepers, and Figure 10 is a perspective view of the aligning pawl.

My improved objective test conducting machine, which has been depicted in its preferred form in the accompanying drawings, provides a casing 1. This casing is formed usually to include integral front, side and top walls 2, 3 and 4 respectively, which may be formed as a die casting. Further, the casing includes a separate rear wall 5 and a readily removable bottom wall 6. The bottom is slidably positioned within grooves 7 formed in the lower edges of the front and side walls 2 and 3, and a spring 8 is carried by the rear wall 5 and is formed to include a humped portion 9 which is receivable within a socket 10 formed in the wall 6. The spring 8 serves to retain the bottom wall in its closed position and permits of its convenient removal, since it is obvious that by lifting the portion 9 of the spring from the socket 10 through finger pressure the bottom may be readily slid to a position removed from or freely opening the bottom of the casing, permitting of convenient access to interior parts. The front of the casing, as shown in Figures 1 and 2, is formed to include a horizontal wall 11 which terminates in a beveled or upwardly inclined wall 12, the walls or surfaces 11 and 12 being unitarily formed with the walls 2, 3 and 4.

Extending longitudinally through the casing and either stationarily or rotatably carried by the walls 3 is a shaft or other form of axial support 13. Rotatable with or about the axis of the shaft 13 is a drum or cylinder 14, consisting of a circular outer wall 15 and a pair of spaced end walls 16. The wall 15 is provided at longitudinally spaced intervals with a plurality of annular grooves 17 which are presented to the outer circumferential portion of the drum. The drum further carries a plurality of headed studs 18 to which are secured the ends of a readily removable flexible sheet of material 19, such for example as paper or cardboard. It will be observed that the end portions of the sheet 19 are formed with openings which pass over the heads of the studs 18 so that when the sheet of paper or other material is applied to the drum or cylinder 14 it will readily retain in connection therewith its applied operative position and yet may be removed with facility and convenience. The sheet is provided at intervals with perforations 20 which are arranged to register with the grooves 17 and these perforations are located in positions to co-operate with selectors 21, hereinafter more fully described. That is, the perforation corresponding with a given question before the student is in registration with the first groove and co-operative with the first selector, if the correct answer is the first answer of those suggested and, likewise, the perforation is in registration with the second groove and co-operative with the second selector if the correct answer is the second, etc. The sheet 19 is further provided with numerals, as indicated at 22, which numerals are adapted to align with a sight opening 23 provided in the top 4 of the casing, and which correspond with the question or questions before the student.

Also loosely situated on the shaft 13 is a counting disc 24 which has its periphery provided with ratchet teeth 25. The side wall of the disc 24 has suitably impressed or designated thereon a circular array of figures or numerals as indicated at 26, which correspond to the number of ratchet teeth 25, and these figures or numerals are visible through a sight opening 27 provided in one of the side walls 3. By the sight opening 23 in the top of the casing the student may view the number of the particular question which he is required to answer, whereas through the use of the sight opening 27 the teacher or instructor, by viewing the disc 24, may note either the number of correct answers to the stimuli presented to the student or, under another system of operation, as will be later explained, the total number of responses or reactions to such stimuli.

The selector keys 21 each comprise, as shown in Figure 8, a body consisting of a flat metallic bar provided with an inwardly projecting shouldered tongue 28 along one of its vertical side edges. The top of the bar is provided with a finger disc or button 29 upon which the tips of the operator's fingers are placed to effect the actuation of the selector. Each of the keys is slidably mounted in a slot 30 provided in the horizontal wall 11 of the casing, so that the disc or button 29 is situated some distance above said horizontal wall 11, as disclosed in Figure 1. The walls of the slot 30 serve to guide for sliding movement each of the selector keys, while the lower portion thereof is guided by being confined within a recessed horizontally extending ledge 31 which projects from the inner portion of the front wall 2. In addition the keys are confined for sliding movement by means of upper and lower horizontally extending stationary rods 32 and 33 respectively, which have their ends secured in the side walls 3.

The lower end of each of the keys 21 carries a stud 34 which serves as a pivotal support for a keeper plate 35, one of such keepers being pivotally carried in conjunction with each of the selector keys. Each keeper plate consists of a flat metallic body having the lower portion thereof apertured as at 36 to receive the stud 34. To one side of the aperture 36 the keeper plate is formed with an off-set lug 37 to which is secured the lower end of a coil spring 38, one of said springs being connected with each of said keeper plates while their upper ends are fastened around the upper rod 32. It will be seen that the springs 38 serve to resiliently maintain the keeper plates and their associated selector keys in a normally elevated position. The upper portion of each of the keeper plates engages with the upper rod 32 so that normally the keeper plates are aligned with the selector keys as shown in Figure 2. However, when said selector keys are depressed it will be seen that the beveled upper edges 39 thereof will ride past the rod 32 so as to permit the keeper plates to rock inwardly, when removed from the influence of the rod 32, by the action of their associated springs 38. Each of the keeper plates also includes an inwardly projecting finger or lug 40, which extends toward the drum or cylinder 14. Between this finger or lug and the beveled upper edge 39 of each keeper plate there is situated a shoulder 41.

Projecting inwardly from the front wall 2 are rectangularly arranged ribs 42 which are recessed for the accommodation of the marginal edges of a plate 43, as shown in Figure 4. Confined between the plate 43 and the inner surfaces of the wall 2 are a plurality of discs and half discs 44 which are allowed but slight relative movement between the side ribs 42. It will be observed that the plate 43 is provided with vertical grooves or slots 45, which slidably receive the inwardly extending fingers 46 formed integrally with the selector keys 21. This construction is provided to permit of the actuation at any given time of but one selector key, and it will be observed that the spacing between and the movement allowed the discs 44 is so limited as to permit of the passing therebetween of but one of the fingers 46. If two of such fingers or selector keys are depressed simultaneously the spacing between the discs is insufficient to allow the actuation or complete movement of the keys. This feature, therefore, requires the student to operate but one key at a time.

The plate 43 is provided at its upper corners with laterally projecting trunnions 47 which operate to effect the pivotal support of a yoke shaped bar or frame 48. The longitudinally extending portion of this bar normally rests upon the shoulders 28 of the selector keys and this feature is insured by means of a coil spring 49 which has one of its ends connected with the yoke bar 48 and its other end connected with the corresponding or complemental yoke bar or frame 50, which is arranged below the yoke bar 48 and pivotally supported by trunnions 51, also carried by the plate 43. The upper yoke bar 48 pivotally carries as at 52 pawls 53, and 53', the former being adapted to engage with the teeth 25 of the counting disc 24 while the pawl 53' engages with the ratchet teeth 54, provided peripherally upon one of the walls 15 of the drum or cylinder 14, which end wall is arranged adjacent to the disc 24. The pawls 53 are pressed into engagement with such ratchet teeth positively by means of a leaf spring 55 carried by the upper yoke bar.

The lower yoke bar 50 has its forward longitudinally extending portion normally arranged in engagement with the under side of the shouldered tongue 28 of each of the selector keys, and is maintained in such engagement by the action of the coil spring 49 and the supplemental spring 49$^a$. This lower yoke bar carries pawls 56 and 57, the former being adapted for engagement with the teeth of the disc 24 while the latter is adapted for engagement with the teeth 54 of the drum or cylinder 14. The pawls are manually set so as to engage with one or the other of said sets of ratchet teeth, and are held in such selected positions of adjustment by means of leaf springs 58 which are carried by the yoke bar 50. It will be understood that the teacher or instructor may adjust the pawls 56 and 57 so that one or the other will be in active operation. Loosely mounted upon the lower rod 33 is an aligning pawl 59 provided at its upper end with a rounded laterally extending projection 60. The pawl 59 is normally maintained in engagement with the ratchet teeth 25 and 54 by a leaf spring 61 carried by the ledge 31, and the function of the pawl 59 is to maintain the alignment of the ratchet teeth 25 and 54 so that the latter will always be in proper position for coaction with the remaining pawls 53, 53', 56 and 57, and to center the numbers on the counter disc and drum with the sight openings 23 and 27.

In operation, the student has before him the sheet of questions as, for example, the one illustrated in Figure 1, each question provided with its own identifying number. After each question, there appears a series of stimuli or possible answers of which any suitable number may be provided. Instead of underscoring by pencil or otherwise the answer which the student considers to be correct, the student depresses a selector key which bears a letter or numeral corresponding to the answer which the student believes to be correct. The selector key is forced downwardly until the beveled nose 39 on the keeper plate moves past the upper rod 32, which allows the keeper plate to respond to the influence of its spring 38. If the proper key has been depressed the lug or finger 40 on the keeper plate carried thereby is permitted to move inwardly by reason of the fact that it passes through one of the perforations provided in the sheet 19 and enters one of the grooves 17, thereby permitting of extended rocking movement on the part of the keeper plate which would not have been afforded if an improper key had been actuated, since in the latter event the finger or lug on the keeper plate would not have been situated in registration with a perforation in the sheet 19 and its rocking movement would have been accordingly restricted.

During the depression of any one of the keys it will be observed that the upper yoke or frame 48 retains its stationary position seated upon the upper surfaces of the shoulders 28 of the remaining selector keys which are not moved or depressed. Therefore, in the event that the proper key has been actuated so that the finger or lug 40 enters the perforation in the sheet 19 the shoulder 41 of the keeper plate moves under the lower edge of the horizontally supported yoke 48. Therefore, when the selected key is released and the same moves upwardly by the action of the spring 38 the shoulder 41 will engage with the yoke 48 so as to rock the latter upwardly, moving in unison therewith the pawls 53 and 53′ so as to effect thereby the rotation of the drum or cylinder 14 and the counting disc 24. The shoulder 41 is withdrawn from engagement with the yoke bar 48 by reason of the beveled edge 39, which is situated to engage automatically with the upper rod 32 so that the keeper plate is rocked about its axis 34 to assume the position disclosed in Figure 2, thereby releasing the yoke bar 48 and permitting the latter to return to its normal position both by gravity and in addition by the positive action of the spring 49 which unites the yokes 48 and 50. It will be noted that the drum and the counting dial are not moved until the selector key begins its upward movement, said drum and disc remaining stationary during the full down stroke of the key. This provides for more positive operation and renders the mechanism independent of the finger pressure applied by the operator.

The above operation sets forth the action of the machine when a proper key has been selected. If, however, an improper key has been selected there will be no operation on the part of the pawls 53 and 53′ for the reason that the yoke 48 is not oscillated, since the keeper plates do not move inwardly sufficiently to permit the shoulders 41 thereof to register with the yoke bar 48. The downward movement of any key, whether correct or incorrect, results in the operation of the lower yoke bar 50. The initial downward rocking movement of the yoke bar 50 from its normal position, as shown in Figure 2, causes the bar to engage with the cam surface 62 of the aligning pawl 59 so as to remove such pawl from engagement with the ratchet teeth 24 and 54, thereby eliminating frictional drag on the machine by coaction of this pawl. Assuming that the pawl 56 is in engagement with the disc 24, it will be seen that the downward movement of the yoke bar 50 will advance the pawl 56 into engagement with the next lower ratchet tooth on the disc 24, the latter being held against rotation in the meanwhile by the pawl 53. Then when the selector key is released the yoke bar 50 is moved upwardly by the springs 49 and 49′, thereby rotating the counting disc 24 so that the reaction or the response of the student is registered in the window 27. In the event the pawl 56 is used, the student observes by the provision of the sight opening 27 when the drum or cylinder 14 does not revolve, therefore if he depresses a key and the same number appears in the opening 27, he is informed that an incorrect answer was selected and that it is necessary to repeat the operation, using another key, to permit the test to proceed. Either system may be used successfully, depending upon the requirements of the instructor or teacher. In the event the pawl 57 is placed in active operation, with the pawl 56 inactive or withdrawn from contact with disc 24, the drum or cylinder 14 is revolved in lieu of the disc 24, which results in permitting the number of correct answers to be registered by the disc 24 rather than the number of efforts or reactions, as is done when the pawl 56 is in active operation. That is, the drum revolves but the disc remains stationary, hence showing the number of answers to which proper response has been made.

In view of the foregoing it will be seen that the present invention provides a simple yet efficient mechanical device for facilitating the taking or conducting of class-room examinations with not only the so-called objective tests but with examinations of any other kind which admit of the employment of such mechanical assistance. The machine as now constructed has the advantage of being readily adapted to successive and different tests, in that to change from one test to another it is merely necessary to substitute different paper sheets corresponding to the character of the test desired. This can be quickly and conveniently accomplished by the instructor and at the same time the pawls 56 and 57 may be adjusted to provide for the desired registration of the student's responses. The construction of the selector keys and coacting parts provides for extended life or durability of the machine under the hard usage of class-room service in that the selector keys do not directly operate the drum and counter mechanism on their manually executed down strokes, the actuation of the drum and counter mechanism being effected following release of the selector keys and by uniformly applied spring pressure which is of a constant character irrespective of the degree of manual pressure applied to depress the keys. The arrangement of the selector keys is such that a student can not determine through the sense of touch whether or not the selector key depressed is the proper key or the one which corresponds to the question under consideration. In other words, the operation of these keys does not depend upon the touch or the skill of the operator, since the actuation of the recording mechanism does not take place until such keys begin their upward or return movement. In this manner the skill or familiarity of the student with the machine does not affect its accuracy in registering question responses.

Many modifications of the invention are, of course, apparent in respect to the specific form of the testing machine above described, and it is intended, therefore, to cover hereby all such modifications as fall within the scope of the following claims.

What is claimed is:

1. In apparatus of the character set forth, a casing, a drum rotatably mounted within said casing, said drum being provided with a plurality of longitudinally spaced depressions in its periphery, a plurality of individually movable selectors, individual keepers operatively associated with said selectors, a counter mechanism, a drum rotating mechanism, and a perforated sheet of flexible material provided in connection with the peripheral portion of said drum and operating in connection with said selectors and keepers to control the operation of said drum and counter mechanism.

2. In apparatus of the character set forth, a casing, a drum rotatably mounted within said casing, said drum having its peripheral portion provided with a plurality of longitudinally spaced annular grooves, a sheet of flexible material surrounding the peripheral portion of said drum and provided at intervals with perforations situated to register with said grooves, a plurality of individual selectors, individual keepers carried by said selectors, means acting on said keepers to move the latter toward said drum, a counter mechanism, and means controlled by the operative positions of said keepers as determined by the perforations in said flexible material to effect limited operation of the drum and counter mechanism simultaneously upon the movement of a given keeper.

3. In a machine of the character set forth, a casing, a drum rotatably mounted within the casing, a removable perforate member carried by the peripheral portion of said drum, a plurality of individually movable selectors, a counter mechanism, and means operable upon the movement of a given selector to effect either simultaneous or separate operation of said drum and counter mechanism, said operation being controlled by the positions of the perforations in said removable member with respect to the selector actuated.

4. In a machine of the character set forth, a casing, a drum rotatably mounted within said casing and having the peripheral portion thereof arranged for cooperation with a plurality of individually operable keys, a counter mechanism, means operable upon the actuation of one of said keys to simultaneously operate said drum and counter mechanism, said key being responsive to the position of the perforations in said drum.

5. In a machine of the character set forth, a casing, a drum mounted for turning movement about its longitudinal axis, the peripheral portion of said drum being provided with a plurality of irregularly spaced perforations, said perforations being arranged in vertical rows longitudinally spaced apart, a plurality of individually operable selector keys movably carried by said casing, a counter mechanism, and individual keepers carried by said keys and movable in unison therewith, said keepers being arranged in registration with said perforations, whereby upon the actuation of a given key said keeper may enter one of the perforations of said drum to admit of simultaneous operation on the part of said drum and counter mechanism through a complete cycle of movement.

6. In a machine of the character set forth, a drum rotatable about its longitudinal axis, said drum having the peripheral portion thereof provided with a plurality of irregularly spaced perforations, said perforations being arranged in vertical rows and spaced longitudinally apart, the perforations at one row thereof being staggered with respect to the perforations of adjacent rows, a plurality of individually movable selector keys, a counter mechanism, and means carried by said selector keys and co-operative with the perforations in said drum to regulate the operation of said counter mechanism and the turning movement of said drum.

7. In a machine of the character set forth, a drum, a removable member carried by the periphery of said drum, said member being provided with a plurality of irregularly spaced perforations, a plurality of individually movable selector keys, a counter mechanism, and means co-operative with said keys and perforations in the removable member for controlling the rotation of said drum and the operation of said counter mechanism.

8. In a machine of the character set forth, a drum rotatably mounted about a fixed longitudinally extending axis, a sheet of flexible material wrapped about the peripheral portion of said drum, said sheet of flexible material being provided with a plurality of irregularly spaced perforations, means for removably securing said sheet of flexible material to said drum, a plurality of individually movable selector keys, a counter mechanism, and means operable upon the selection of a given key to effect limited rotation of said drum and operation of said counter mechanism through co-action with the perforations in said removable sheet of material.

9. In a machine of the character set forth, a casing, a drum mounted for rotation about its longitudinal axis and arranged within said casing, said drum having the peripheral portion provided with a plurality of longitudinally spaced annularly extending grooves, means carried in connection with said drum to removably maintain upon the peripheral portion thereof a perforated sheet of flexible material, with the perforations of said sheet arranged in registration with said drum, a plurality of individually movable selector keys carried by said casing, a counter mechanism, and a plurality of keeper plates movably carried by said keys and arranged in registration with the perforations in the sheet of a flexible material applied to said drum.

10. In a machine of the character set forth, a casing, a cylinder rotatably mounted within said casing about a longitudinal axis, a counter dial rotatable within said casing about said longitudinal axis independently of said drum, the peripheral portion of said drum being provided with a plurality of irregularly spaced sockets, a plurality of individually movable selector keys carried by said casing, a keeper plate pivotally carried by each of said keys, said keeper plates being arranged in registration with the perforations in said drum, a pivotally mounted frame, pivoted pawls carried by said frame and arranged to engage in ratchet teeth provided on said drum and counter dial, spring means acting on said keys to maintain the same in normal positions, said frame being moved only by a keeper plate which enters one of the sockets of said drum when the key carrying the plate is depressed.

11. In a machine of the character disclosed, a casing, a drum rotatably mounted within said casing and having the peripheral portion thereof provided with a plurality of irregularly spaced sockets, said drum being provided with peripheral ratchet teeth at one end thereof, a counter dial rotatable in said casing about the axis of said drum, said dial being provided with ratchet teeth arranged in registration with the teeth of said drum, a pivotally mounted frame arranged in said casing, pawl means pivotally carried by said frame and co-operative with the ratchet teeth of the drum and counter dial, a plurality of individually movable selector keys carried by said casing, and spring pressed pivoted detents carried by said keys, said detents being movable with said selector keys to register with the sockets provided in said drum, whereby upon the release of said keys said detents serve to pivotally move said frame and pawl mechanism when in engagement with said sockets and to rotate the drum and dial.

12. In a machine of the character disclosed, a casing, a drum rotatably mounted within said casing and provided peripherally with a plurality of irregularly spaced openings, a plurality of individually movable selector keys carried by said casing, said keys being provided with spaced shoulders, a pair of yoke shaped frames pivotally mounted within said casing, spring means operating to maintain said frames in engagement with the shoulders of said keys, two pivoted pawls connected with the upper of said frames, the first disposed in engagement with the teeth carried by said drum, a counter dial provided with ratchet teeth and arranged to be engaged by the second pawl of said upper frame, a pair of pivoted pawls carried by the lower of said frames and movable selectively into and out of engagement with the ratchet teeth of said dial and drum, the lower of said frames being operated upon the depression of any one of said keys, and the upper of said frames being operated only upon the depression of a key having a pre-determined relationship with the openings in said drum.

13. In a machine of the character set forth, a casing, a drum mounted for turning movement about its longitudinal axis, the peripheral portion of said drum being provided with a plurality of irregularly and arbitrarily spaced perforations, said perforations being arranged in longitudinally spaced vertical rows, a drum rotating mechanism, a counter mechanism, a plurality of individually operable selector keys movably carried by said casing, and individual keepers carried by said keys and movable in unison therewith, said keepers being arranged in registration with said perforations, whereby upon the action of a given key its keeper may enter one of the perforations of said drum to admit of simultaneous operation on the part of said drum rotating mechanism and counter mechanism through a complete cycle of operative movement, the action of a key having a keeper not in engagement with said perforations serving to operate only one of said mechanisms.

14. In a machine of the character set forth, a drum rotatable about its longitudinal axis, said drum having the peripheral portion thereof provided with a plurality of irregularly spaced perforations, said perforations being arranged in vertical rows and spaced longitudinally apart, the perforations of one row thereof being staggered with respect to the perforations of adjacent rows, a plurality of individually movable selector keys, a counter mechanism, and means carried by said selector keys and co-operative with the perforations in said drum to regulate the operation of said counter mechanism and the turning movement of said drum, so that a key in registration with a perforation will operate both the counter mechanism and drum but any other key will operate only the drum.

15. In a machine of the character set forth, a drum, a removable member carried by the periphery of said drum, said member being provided with a plurality of irregularly and arbitrarily spaced perforations, a plurality of individually movable selector keys, a counter mechanism, and means co-operative with said keys and perforations in the removable member for controlling the rotation of said drum and the operation of said counter mechanism, whereby a key in registration with a perforation will operate both drum and counter mechanism, whereas a key not in registration with a perforation will operate only the drum or the counter mechanism.

16. In a machine of the character set forth, a casing, a drum mounted for rotation about its longitudinal axis and arranged within said casing, means formed in connection with said drum for carrying upon the peripheral portion thereof a perforated sheet of flexible material, a plurality of individually movable selector keys carried by said casing, a counter mechanism, and a plurality of keeper plates movably carried by said keys and arranged in positions of relative registration with the perforations in the sheet of flexible material carried by the drum.

17. In a machine of the character disclosed, a casing, a drum rotatably mounted within said casing and provided peripherally with a plurality of irregularly spaced openings, said drum being provided with peripheral ratchet teeth at one end thereof, a counter dial provided with peripheral ratchet teeth, a plurality of individually movable selector keys carried by said casing, said keys being provided with shoulders, detents carried by said selector keys, a pair of yoke shaped frames pivotally mounted within said casing, spring means operating to maintain said frames in engagement with the shoulders of said keys, a pair of pivoted pawls connected with the upper of said frames disposed in engagement with the teeth carried by said drum and counter dial, a second pair of pivoted pawls carried by the lower of said frames and movable selectively into and out of engagement with the ratchet teeth of said dial and drum, the lower of said frames being operated upon the depression of any one of said keys while the upper of said frames being operated only upon the depression of a key having a detent in engagement with one of the openings in said drum.

18. In a machine of the character set forth, a casing, a drum rotatably mounted within said casing, means provided in connection with said drum for carrying upon the peripheral portion thereof a perforated sheet of flexible material, a drum rotating mechanism, a counter mechanism, a plurality of individually movable selector keys operating the drum rotating mechanism, and a plurality of keeper plates carried by said keys in registration with the perforations in said sheet of flexible material so as to move into operative engagement with said counter mechanism upon entering a perforation.

19. In apparatus of the character set forth, a casing, a drum rotatably carried by said casing, means in connection with said drum for carrying upon the peripherial portion thereof a perforated sheet of flexible material, a drum rotating mechanism, a counter mechanism, a plurality of individually movable selector keys carried by said casing and operating said counter mechanism, and spring pressed keepers carried by said keys in registration with the perforations in said sheet of flexible material so as to move into operative engagement with said drum rotating mechanism upon entering a perforation.

20. In a machine of the character set forth, a drum provided at one end with peripheral ratchet teeth, a removable member carried by the periphery of said drum, said member being provided with a plurality of irregularly spaced perforations, a plurality of individually movable selector keys, spring means acting keys to maintain the same in normal positions, a pivotally mounted frame arranged in said casing for movement upon the depression of any one of said selector keys, pawl means pivotally carried by said frame in engagement with the ratchet teeth on said drum for effecting the rotation of the latter, a counter mechanism, a second pivoted frame in operative engagement with said counter mechanism, and spring pressed detents carried by said keys in registration with the perforations in said removable member so that said detents will move into engagement with said perforations to admit of the movement of said second pivoted member and consequent operation of said counter mechanism upon entering said perforations.

21. In a machine of the character set forth, a drum provided at one end with peripheral ratchet teeth and carrying a removable perforated sheet of flexible material, a pivoted arm, a pawl carried by said arm in engagement with said ratchet teeth to rotate said drum, a plurality of individually movable selector keys so mounted that depression of any one of which will move said pivoted arm to effect the rotation of said drum, a counter mechanism, a pivoted frame in operative engagement with said counter mechanism, a keeper plate pivotally carried by each of said keys and having a detent in registration with the perforations in said removable sheet, said keepers being each provided with a shoulder so placed that when the detent of a keeper plate enters a perforation upon the depression of the key by which it is carried said shoulder will make operative engagement with the frame actuating the counter mechanism for effecting the operation of said counter mechanism upon return movement of the selector key to a normal position.

22. In a machine of the character disclosed, a casing, a drum rotatably mounted within said casing and having the peripheral portion thereof provided with a plurality of irregularly spaced sockets, said drum being provided with peripheral ratchet teeth at one end thereof, a counter mechanism, a frame in engagement with said counter mechanism, a pawl carried by said frame in engagement with said ratchet teeth, a plurality of selector keys, spring pressed selector fingers carried by said keys and arranged in registration with said sockets so that upon entering one of said sockets said finger will enter into operative engagement with said frame, and a second frame actuated by the movement of any one of said selector keys and adjustable for engagement with either the ratchet teeth on said frame or said counter mechanism.

In testimony whereof I affix my signature.

SIDNEY L. PRESSEY.